United States Patent
Behl et al.

(10) Patent No.: US 6,200,356 B1
(45) Date of Patent: Mar. 13, 2001

(54) LITHIUM ION SECONDARY ELECTROCHEMICAL CELL AND A METHOD OF PREVENTING THE ELECTROCHEMICAL DISSOLUTION OF A COPPER CURRENT COLLECTOR THEREIN

(75) Inventors: Wishvender K. Behl, Gaithersburg; Donald Foster, Laurel; Jeffrey Wolfenstine, Silver Spring, all of MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/313,868

(22) Filed: May 17, 1999

(51) Int. Cl.[7] .............................. H01M 6/16; H01M 4/04; H01M 4/64
(52) U.S. Cl. ......................... 29/623.1; 29/2; 429/231.95; 429/245
(58) Field of Search ............................... 429/245, 231.95; 29/2, 623.1

(56) References Cited

U.S. PATENT DOCUMENTS

| | | | |
|---|---|---|---|
| 5,053,297 | * 10/1991 | Yamahira et al. | 429/194 |
| 5,262,254 | * 11/1993 | Koksbang et al. | 429/192 |
| 5,340,368 | * 8/1994 | Koksbang et al. | 29/263.5 |
| 5,561,006 | * 10/1996 | Lecerf et al. | 429/218 |
| 5,643,695 | * 7/1997 | Barker et al. | 429/197 |
| 5,670,277 | * 9/1997 | Barker et al. | 429/220 |
| 5,712,059 | * 1/1998 | Barker et al. | 429/197 |
| 5,744,265 | * 4/1998 | Barker et al. | 429/218 |
| 5,882,218 | * 3/1999 | Reimers | 429/224 |
| 6,048,645 | * 4/2000 | Saidi et al. | 429/231.95 |

\* cited by examiner

*Primary Examiner*—Clifford C. Shaw
*Assistant Examiner*—Kiley Stoner
(74) *Attorney, Agent, or Firm*—Paul S. Clohan, Jr.; U. John Biffoni

(57) ABSTRACT

A lithium ion secondary electrochemical cell includes an anode comprising both a material capable of reversibly incorporating an alkali metal, and a copper current collector, a cathode capable of reversibly incorporating an alkali metal, and an electrolyte which includes a solution of an alkali metal salt dissolved in a polar organic solvent. A method of preventing the electrochemical dissolution of the copper current collector in the lithium ion battery electrolyte includes charging the lithium ion cell immediately after its assembly. By immediately charging the freshly assembled lithium ion cell, lithium will be intercalated into carbon. The copper current collector, therefore, will be at the lithium-carbon potential and thus will be cathodically protected, and will not electrochemically dissolve in the lithium ion battery electrolyte.

5 Claims, No Drawings

LITHIUM ION SECONDARY ELECTROCHEMICAL CELL AND A METHOD OF PREVENTING THE ELECTROCHEMICAL DISSOLUTION OF A COPPER CURRENT COLLECTOR THEREIN

The invention described herein may be manufactured, used, and licensed by the U.S. Government for governmental purposes without the payment of any royalties thereon.

BACKGROUND OF THE INVENTION

1. Field of the Invention

This invention relates generally to a high energy rechargeable battery, and more specifically to a rechargeable lithium ion battery having a carbon anode. The invention relates even more specifically to a method of preventing the electrochemical dissolution of a copper current collector in the lithium ion battery electrolyte.

2. Discussion of the Prior Art

In a lithium ion battery, the metallic lithium anode is replaced with a lithium intercalation host, which is usually a carbonaceous material. One conventional method for fabricating such an anode employs a slurry of carbonaceous material with a binder solution. Examples of the binder solution include a 5 wt. % PTFE (TEFLON) emulsion; a 2.86 wt. % polyvinylidene fluoride solution in 50:50 1-methyl-2-pyrrolidinine and tetrahydrofuran; or a 2 wt. % aqueous 2-hydroxy ethyl cellulose solution. After the slurry has been spread on an electrolytic copper foil current collector, the electrode is vacuum dried at about 120° C.

A problem associated with such carbon electrodes, however, is that copper metal has been found to dissolve in the battery electrolyte and then deposit at the positive electrode, resulting in premature cell failure.

Therefore, a general need exists to provide a lithium ion battery comprising an electrolyte in which copper is not susceptible to electrochemical dissolution. An even more specific need exists to provide a method of preventing the dissolution of a copper current collector in a rechargeable lithium ion battery having a carbon anode.

SUMMARY OF THE INVENTION

It is an object of the present invention to provide a lithium ion secondary electrochemical cell comprising an electrolyte in which copper is not susceptible to electrochemical dissolution. It is a further object of the present invention to provide a method of preventing the electrochemical dissolution of a copper current collector in a lithium ion battery electrolyte.

Accordingly, the present invention advantageously relates to a lithium ion secondary electrochemical cell comprising an anode comprising both a material capable of reversibly incorporating an alkali metal, and a copper current collector, a cathode capable of reversibly incorporating an alkali metal, and an electrolyte comprising a solution of an alkali metal salt dissolved in a polar organic solvent.

The present invention further relates to a method of charging the lithium ion cell immediately after its assembly.

The primary advantage associated with the present cell and method is that by immediately charging the freshly assembled lithium ion cell, lithium will be intercalated into carbon. The copper current collector, therefore, will be at the lithium-carbon potential and thus will be cathodically protected, and will not electrochemically dissolve in the lithium ion battery electrolyte.

DESCRIPTION OF THE PREFERRED EMBODIMENTS

The present invention will be disclosed in terms of the currently perceived preferred embodiments thereof The present invention is based on the discovery that copper is unsusceptible to electrochemical dissolution in lithium ion battery electrolytes up to a potential of about 3.5 V versus the lithium potential. These electrolytes comprise approximately 1.0 molar solutions of a compound such as lithium hexafluorophosphate ($LiPF_6$), lithium imide [$Li(CF_3SO_2)_2N$], or lithium methide [$Li(CF_3SO_2)_3C$], or mixtures thereof, dissolved in a ternary mixture of ethylene carbonate-propylene carbonate-dimethyl carbonate.

The present invention therefore comprises a secondary electrochemical cell comprising an anode, a cathode, and an electrolyte comprising a solution of an alkali metal salt dissolved in a polar organic solvent. The anode comprises both a material, such as, for example, carbon, which is capable of reversibly incorporating an alkali metal, and a copper current collector.

The cathode comprises a material which is capable of reversibly incorporating an alkali metal. The cathode material can be selected from the group consisting of lithium cobalt oxide, lithium nickel oxide, lithium manganese oxide, and mixtures thereof.

The electrolyte comprises a solution of an alkali metal salt selected from the group consisting of lithium hexafluorophosphate, lithium imide, lithium methide, and lithium hexafluoroarsenate dissolved in a polar organic solvent selected from the group consisting of ethylene carbonate, dimethyl carbonate, ethyl methyl carbonate, propylene carbonate, and mixtures thereof.

If the potential of copper exceeds 3.5 V, however, then the copper is electrochemically oxidized and is dissolved in the battery electrolyte.

Lithium ion cells are customarily fabricated in the discharged state so that the anode consists of only carbon without any intercalated lithium. It is theorized that copper metal and carbon form local cells, with copper metal as the negative electrode, and cause the dissolution of copper metal in the lithium ion battery electrolyte.

According to the present invention, therefore, the lithium ion cells are charged immediately after their assembly. As soon as the freshly assembled cells are charged, lithium is intercalated into carbon, and these electrodes assume the thermodynamic potential of the lithium-carbon intercalation compound. Since this potential is close to zero volts, the copper current collector is cathodically protected and does not undergo any further electrochemical oxidation in the lithium ion battery electrolyte.

The present invention, therefore, provides both a lithium ion secondary electrochemical cell and a method of preventing the electrochemical dissolution of copper current collectors in a lithium ion battery electrolyte. By immediately charging the freshly assembled lithium ion cells, lithium will be intercalated into carbon. The copper current collector, therefore, will be at the lithium-carbon potential and thus will be cathodically protected, and will not electrochemically dissolve in the lithium ion battery electrolyte.

While only certain preferred embodiments of this invention have been shown and described by way of illustration, many modifications will occur to those skilled in the art. It is, therefore, desired that it be understood that it is intended herein to cover all such modifications that fall within the true spirit and scope of this invention.

What is claimed is:

1. A method of preventing the electrochemical dissolution of a copper current collector in a lithium ion battery electrolyte, said method comprising the step of:

by means of a lithium ion secondary electrochemical cell comprising:
an anode comprising a material capable of reversibly incorporating an alkali metal, and a copper current collector;
a cathode comprising a material capable of reversibly incorporating an alkali metal; and
an electrolyte comprising a solution of an alkali metal salt dissolved in a polar organic solvent;

charging said electrochemical cell immediately after said electrochemical cell is filled with said electrolyte.

2. A method of preventing the electrochemical dissolution of a copper current collector according to claim 1, wherein said material of the anode is carbon.

3. A method of preventing the electrochemical dissolution of a copper current collector according to claim 1, wherein said material of the cathode is selected from the group consisting of lithium cobalt oxide, lithium nickel oxide, lithium manganese oxide, and mixtures thereof.

4. A method of preventing the electrochemical dissolution of a copper current collector according to claim 1, wherein said alkali metal salt is selected from the group consisting of lithium hexafluorophosphate, lithium imide, lithium methide, and lithium hexafluoroarsenate.

5. A method of preventing the electrochemical dissolution of a copper current collector according to claim 1, wherein said polar organic solvent is selected from the group consisting of ethylene carbonate, dimethyl carbonate, ethyl methyl carbonate, propylene carbonate, and mixtures thereof.

* * * * *